(12) United States Patent
Angelo

(10) Patent No.: US 6,609,751 B1
(45) Date of Patent: Aug. 26, 2003

(54) BICYCLE SEAT

(76) Inventor: George M. Angelo, R.D. #4, Box 645, DuBois, PA (US) 15801

( * ) Notice: Subject to any disclaimer, the term of this patent is extended or adjusted under 35 U.S.C. 154(b) by 0 days.

(21) Appl. No.: 10/127,246

(22) Filed: Apr. 22, 2002

(51) Int. Cl.[7] .................................................. B62J 1/00
(52) U.S. Cl. ............... 297/201; 297/195.1; 297/215.13; 297/208; 297/312
(58) Field of Search .............................. 297/209, 195.1, 297/208, 312, 215.13; 482/57, 56, 61

(56) References Cited

U.S. PATENT DOCUMENTS

| | | | |
|---|---|---|---|
| 572,062 A | | 11/1896 | Peck |
| 588,039 A | | 8/1897 | Upson |
| 3,883,173 A | * | 5/1975 | Shephard et al. ........... 297/312 |
| 4,089,559 A | | 5/1978 | Prange et al. |
| 4,387,925 A | * | 6/1983 | Barker et al. ............... 297/201 |
| 4,451,086 A | * | 5/1984 | Seven ......................... 297/312 |
| 5,597,202 A | | 1/1997 | Andersen |
| 5,725,274 A | * | 3/1998 | Bergmeister ................ 297/201 |
| 5,988,740 A | * | 11/1999 | Caraballo ................... 297/201 |
| 6,142,562 A | * | 11/2000 | Varan ......................... 297/201 |
| 6,183,043 B1 | * | 2/2001 | Nelson ........................ 297/201 |
| 6,357,825 B1 | * | 3/2002 | Bavaresco ................... 297/201 |
| 6,382,651 B1 | * | 5/2002 | Enda ......................... 280/288.4 |
| 6,402,236 B1 | * | 6/2002 | Yates .......................... 297/201 |

FOREIGN PATENT DOCUMENTS

| | | |
|---|---|---|
| CA | 10068 | 3/2000 |
| DE | 192629 | 1/1907 |
| DE | 42 06 501 A1 | 8/1992 |
| DE | 114135 | 4/1999 |
| FR | 860825 | 1/1941 |
| GB | 21217740 A * | 1/1984 |

* cited by examiner

*Primary Examiner*—Peter M. Cuomo
*Assistant Examiner*—Erika Garrett
(74) *Attorney, Agent, or Firm*—Buchanan Ingersoll, P.C.

(57) ABSTRACT

A bicycle seat has a pair of guide rails each having a seat pad pivotably attached to the front end of the guide rail. An elongated support has a wing at each end. The guide rails travel on the wings in two substantially parallel paths. A pulley is mounted on the center of the elongated support. One or more straps are connected to the front ends of the guide rails or the back ends of the guide rails so that motion of one guide rail in a first direction causes movement of the second guide rail in an opposite direction. One or more springs can be connected between the guide rails and the elongated support.

32 Claims, 5 Drawing Sheets

BICYCLE SEAT

FIELD OF THE INVENTION

This invention relates to a seat for a bicycle.

BACKGROUND

The present invention relates to a bicycle seat. Although the seat is especially suited for bicycles, it is basically possible to put the seat to advantageous use in other pedal-propelled vehicles, for instance, in exercise or fitness devices provided with pedals.

A conventional bicycle saddle entails considerable disadvantages, especially for those riders who cycle only occasionally. A small saddle, which is often used in racing bicycles or mountain bikes, strongly squeezes the soft tissue just below the pubic bone, which can cause severe pain if the rider is not accustomed to cycling. Although a larger saddle may reduce such painful accompanying phenomena during pedaling, such a saddle has the disadvantage that the rider slips constantly back and forth on the saddle with his buttocks while pedaling. If the rider is not accustomed to such movements, this motion will cause the buttocks to gradually get sore. To relieve the discomfort some riders stand while pedaling. However, standing while pedaling a bicycle is not very efficient and promotes back and leg discomfort. The neck, shoulders and other parts of the body can also be affected by the manner in which the rider is supported on the bicycle.

It has also been reported that bicycling can cause injury to the penial artery and cause male erection problems. Many bicycle seats press against the blood vessels in the groin restricting blood flow in that area. Consequently, there is a need for a bicycle seat. that exerts less pressure on the perineal region of the body.

U.S. Pat. No. 4,089,559 discloses a bicycle seat comprising two movable seat halves that are supported to pivot in opposite directions. Another bicycle seat having two halves is disclosed in U.S. Pat. No. 5,725,754. These halves each have an arc shaped bottom that rides on rollers. Each half can move independently from the other half. Another type of pivoting bicycle seat disclosed in U.S. Pat. No. 6,142,562 has trough members pivotably attached to the top of a pair of arms extending from the bicycle frame. These seats and many others were designed to relieve pressure in the perineal region of the human body of the rider. However, the seats developed prior to the present invention either did not solve the problem or could not be easily manufactured. Therefore, there is a need for a bicycle seat which relieves pressure in the perineal region and that can be easily manufactured, and more importantly solve the problem of sustaining comfortable seat pad positions and maximizing leg motion efficiency.

SUMMARY OF THE INVENTION

I provide a bicycle seat in which an elongated support has a pulley, or other low friction guide to reverse direction of a tension cable or strap attached to the center of the support and wings attached to each end. A guide rail is carried by the each wing. The guide rails are attached in a manner to permit movement of the first guide rail over the first wing along a first path, and movement the second guide rail over the second wing along a second path, such that the second path is substantially parallel to the first path. I prefer to provide a pair of wheels on each of the wings on which the guide rails ride. Seat pads are pivotably attached to the front end of each of the guide rails. There is a plane intersecting the first path and the second path through which plane the seat pads pass when the first and second guide rails move along their respective paths. The seat pads on the end of each guide rail may be saddle shaped. I also may attach a bicycle seat to the mounting bracket. This seat may include a horn.

At least one strap passes over the pulley, has one end attached to the rear end of the first guide rail and an opposite end attached to the rear end of the second guide rail. A pair offsprings is attached between the elongated support and each of the first guide rail or the second guide rail. If desired one spring could be used, but the system would not be balanced.

A second present preferred embodiment is similar to the first embodiment but the strap is attached to the front ends of the guide rails rather than the rear ends. Yet, another embodiment has two straps. One strap is connected to the front ends of the guide rails and the second strap is attached to the rear ends of the guide rails. In all cases, the straps are kept in tension.

Other objects and advantages of the present invention will become apparent from a description of the present preferred embodiments shown in the drawings.

DESCRIPTION OF THE PREFERRED EMBODIMENTS

Figure 1:
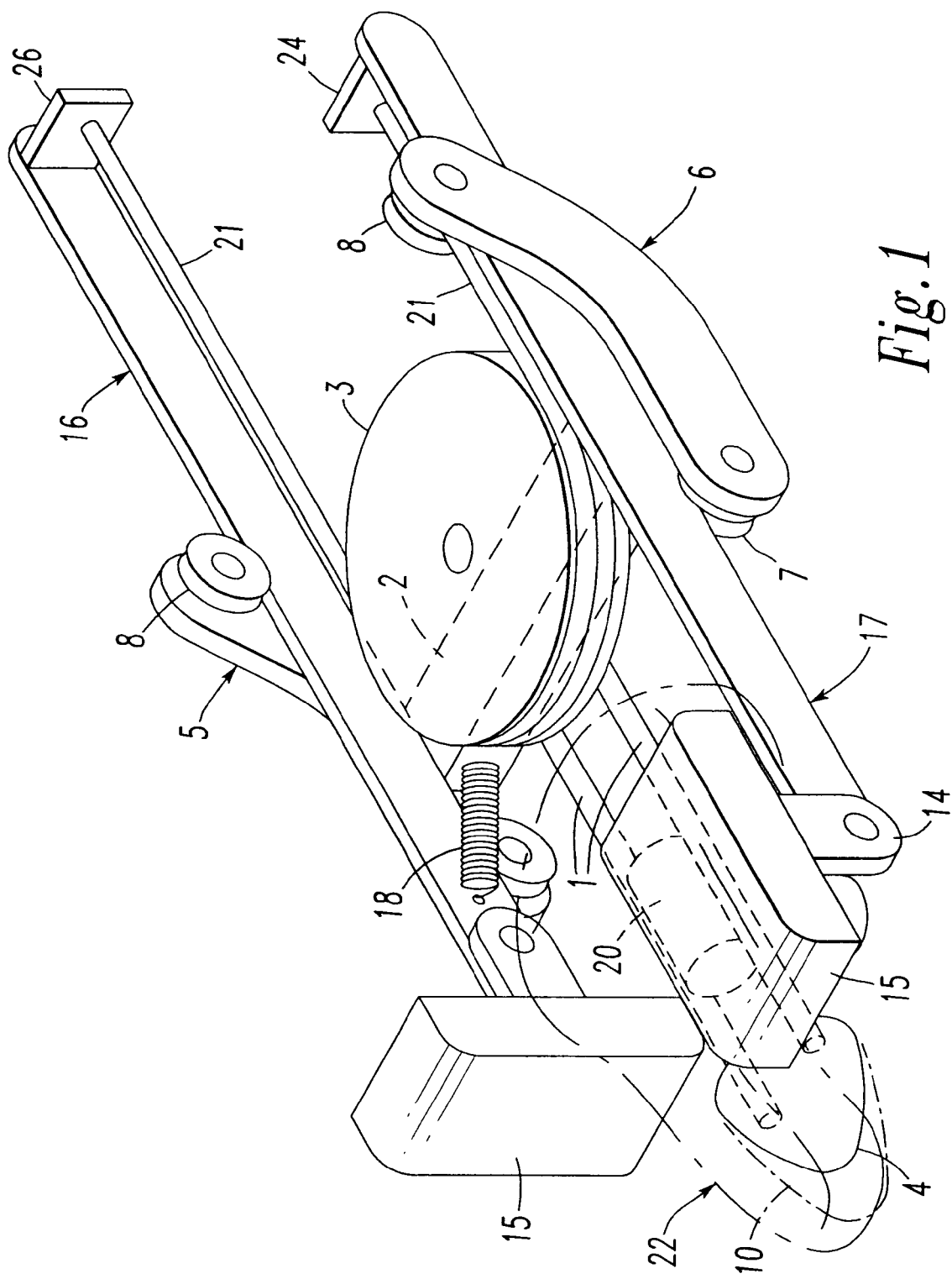
FIG. 1 is a perspective view of a first present preferred embodiment of my bicycle seat in which the guide rails are in a first position.
Figure 2:
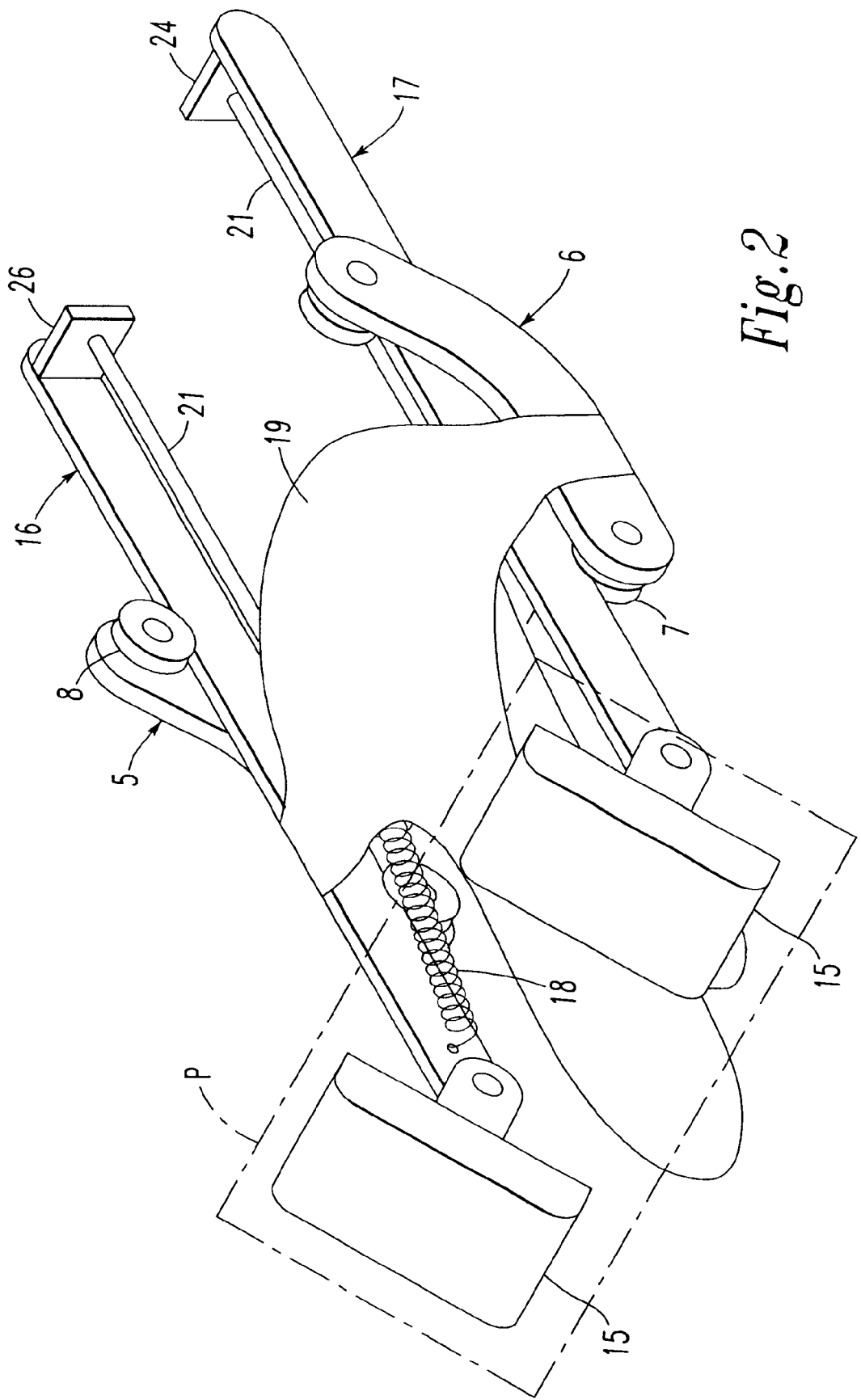
FIG. 2 is a perspective view of the embodiment shown in FIG. 1 in which the guide rails are in a second position.
Figure 3:
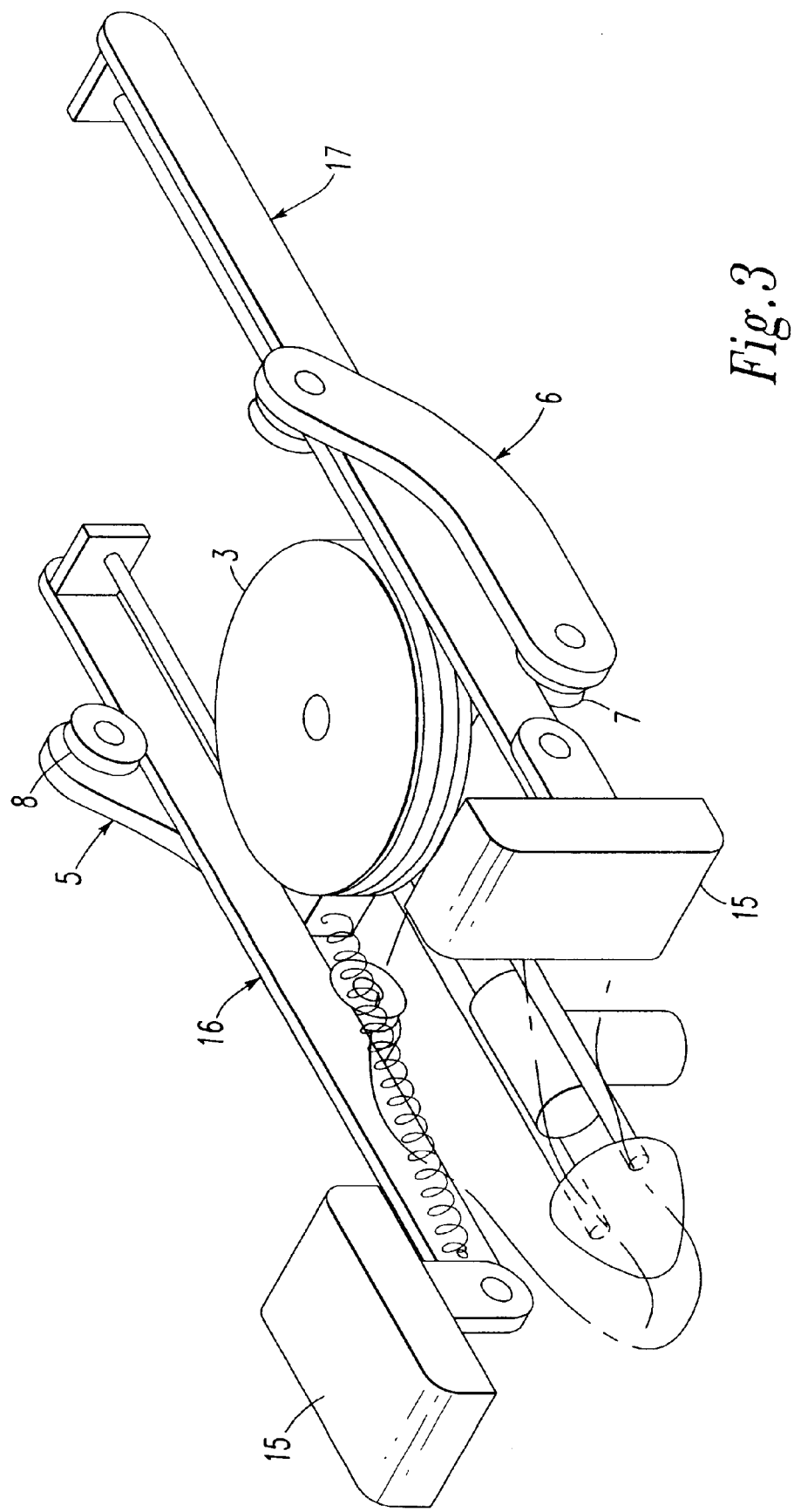
FIG. 3 is a is a perspective view of the embodiment shown in FIGS. 1 and 2 in which the guide rails are in a third position, such that the second position is intermediate the first and third positions.
Figure 4:
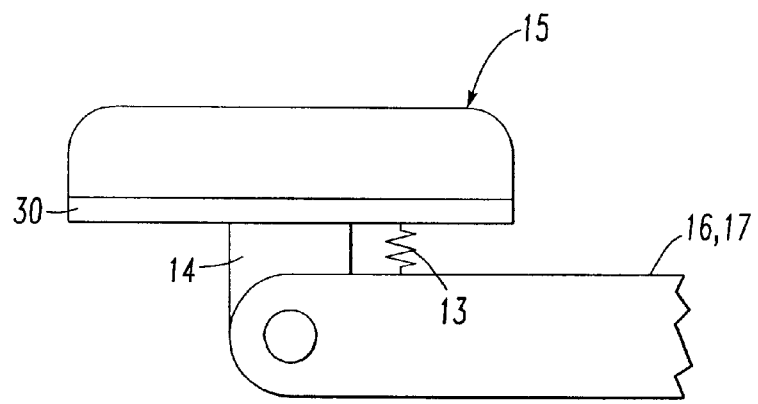
FIG. 4 is a side view of one of the guide rails and attached seat pad with an optional seat pad shim.

A first present preferred embodiment of my bicycle seat is shown in FIGS. 1 through 3. This bicycle seat has a mounting bracket formed as a pair of support bars 1 attached to a standard seat bracket 20. This seat bracket 20 is attached to the support rod that extends from the center of the frame of a bicycle (not shown). The seat bracket may be part of a standard bicycle saddle seat 22 shown in chain line in FIG. 1. A safety cap 4 is placed over the end of the support bars. A horn 10 shown in dotted line could replace the safety cap and extend forward from the seat bracket to provide the sensation of the former saddle seat when standing. This horn could be used to steer and absorb shock while the rider pinches the horn with his or her knees to keep the bicycle under the rider. The support bars 1 are attached to an elongated support 2. There is a right wing 5 attached at one end of the elongated support 2 and a left wing 6 attached at an opposite end of that support. I prefer to provide a telescoping connector between each wing and the elongated support so that the spacing between the wings can be adjusted. Otherwise, width adjustments can be made by a slotted connection between seat pad 15 and bracket 14. A front guide wheel 7 and a rear guide wheel 8 are attached to each of the wings. Each wing supports a guide rail 16 or 17 that rides on the front and rear guide wheels. The guide rails could be tubular, but preferably have an inverted U-shaped cross-section. The two guide rails travel on these wheels 7 and 8 in one of two parallel or substantially parallel paths. Referring to FIG. 4, a bracket 14 is attached to the front end of each guide rail. This bracket pivotably attaches a seat pad 15 to the guide rail. Preferably, the seat pad is contoured to fit the back of a rider's hip. Accessory seat pads should be made available for extremely thin and wide body anatomies. Also, a spring 13, visible in FIG. 4, between seat pad 15 and guide rails 16 and 17 is preferred to keep seat pads parallel with guide rails when the rider leaves the seat.

A pulley 3 is mounted on the center of the elongated support 2. A first cable or strap 21 has one end attached to the rear 24 of the left guide rail, wraps around the pulley and is attached at an opposite end to the rear 26 of the right guide rail. The pulley acts as a transition member or guide to reverse the direction of tension in the cables or straps. Other low-friction transition members could be used and are disclosed in FIGS. 6 and 7. When the left guide rail 17 is in its forward position the right guide rail 16 is in its retracted position as shown in FIG. 1. Conversely, when the right guide rail 16 is in its forward position the left guide rail 17 is in its retracted position as shown in FIG. 3. The pulley and strap thus synchronize the opposed linear motion of the guide rails. An optional spring 18 is connected between the elongated support and the front of one guide rail. If desired, a second spring can be attached between the elongated support and the second guide rail. If only one strap or cable is used, two springs will be required to maintain tension in the strap or cable. The springs cause the guide rails to move to a neutral position shown in FIG. 2. Consequently, there is at least one plane P shown in dotted line in FIG. 2 through which both seat pads move. This plane intersects the paths along which the guide rails 16 and 17 travel. I prefer to provide a lightweight shroud 19, shown in FIG. 2, over the pulley 3, elongated support 2, wings 5 and 6 and a portion of the guide rails 16 and 17. The shroud prevents clothing and other loose items from becoming entangled with the pulley and strap. The shroud could be large enough to cover the wings and the wheels on the wings.

The guide rails 16, 17 and attached seat pads 15 move in opposite directions during pedaling. One guide rail and associated seat pad moves rearward when the associated foot of the rider moves downward during pedaling, whereas the other guide rail and associated seat pad moves forward as the associated foot moves into the lifted position. These movements are reversed after the pedals have passed the lowermost or uppermost pedaling point. Consequently, the seat pads are adapted to the movement of the thigh and buttocks area of the rider. For that reason, the rider will not slip on the seat pads but will rest on them without any relative movement between the rider and the seat pad. Furthermore, because the seat pads have a relatively large size and preferred contact area as compared with conventional bicycle saddle seats, painful pressure is reliably prevented.

During use, each of the two seat pads is located under the femur-to-pelvis ball socket in the leg of the rider and just forward of the buttock muscle. Upon the downward motion of the cyclist's driving leg, the guide rail moves rearward and the seat pad rotates from a horizontal position to a near vertical position. As that motion is occurring, the seat pad on the other guide rail is moving forward to a position toward the hamstring muscle of the opposite leg. This forward movement corresponds to a shift in the cyclist's center of mass as the knee raises the heavy quadriceps and hamstring muscles bring the femur bone toward a position parallel with the road surface. The result is that the seat pads provide comfortable support for the rider. Moreover, this seat offers relief to the sensitive region of the rider's body where the urinary tract and reproductive system approach the body's surface in both the male anatomy and the female anatomy. Damage and discomfort to the perineum are thereby avoided.

The combination of the rotation of the seat pad and the linear motion of the guide rail causes the surface of the seat pad to travel through an arc, much like the motion of the seat halves disclosed in U.S. Pat. No. 5,725,274. The effective pivot point is above the seat pad concentric with the hip joint. This radius can be changed for riders with smaller anatomies by placing a shim 30 between the seat pad 15 and the bracket 14 to which the seat pad is attached as shown in FIG. 4.

Figure 5:
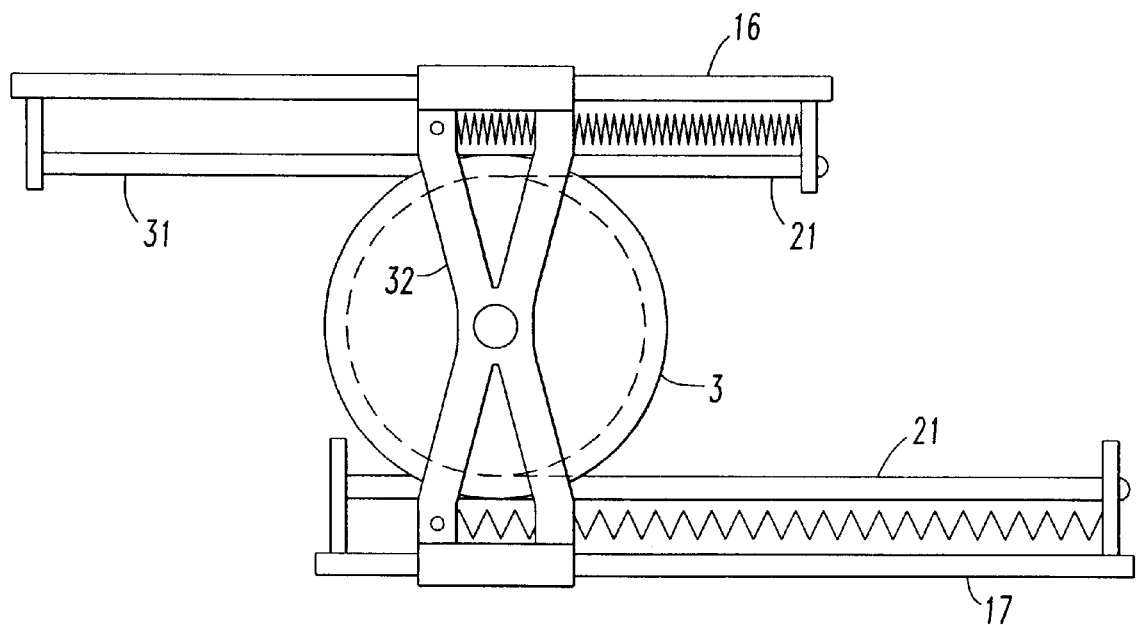
FIG. 5 is bottom view of a second present preferred embodiment of my bicycle seat.

A second present preferred embodiment shown in FIG. 5 is similar to the first embodiment. However, in this embodiment there is a second strap or cable 31 running from the front end of the right guide rail 16 around the pulley 3 to the front end of the left guide rail 17. The pulley has an upper track or groove through which the first strap or cable 21 travels and a lower track or groove through which the second strap or cable 31 travels. Another difference between the two embodiments is that the elongated support 32 is X-shaped rather than tubular.

Figure 6:
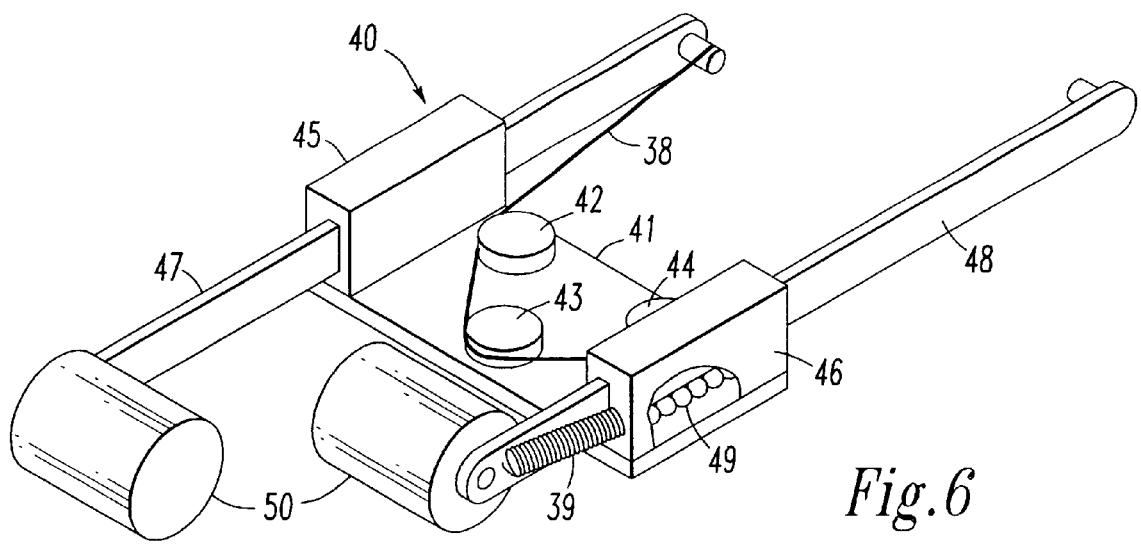
FIG. 6 is a perspective view of a third present preferred embodiment of my bicycle seat.

A third present preferred embodiment of my bicycle seat 40 shown in FIG. 6 has three pulleys 42, 43, 44 on an elongated support member 41. A strap or cable 38 extends from the rear of one guide rail 47 around the pulleys to the rear of the second guide rail 48. The guide rails are carried by wings 45, 46 at opposite ends of the elongated support 41. These wings surround the guide rail and contain roller bearings 49 on which the guide rails ride. Springs 39 are connected between the wings and the front of each guide rail 47, 48. In this embodiment the seat pads are padded posts 50. The padded posts 50 are used in place of the rectangular contoured seat pads in the previous embodiments. Although I prefer to provide roller bearings in this embodiment, one could omit the bearings so that the guide rail rides on a smooth surface within the wings. That surface should be highly polished or have a non-stick coating to reduce friction. Grease or other lubricants may also be used between the guide rail and the smooth surface of the wing.

Figure 7:
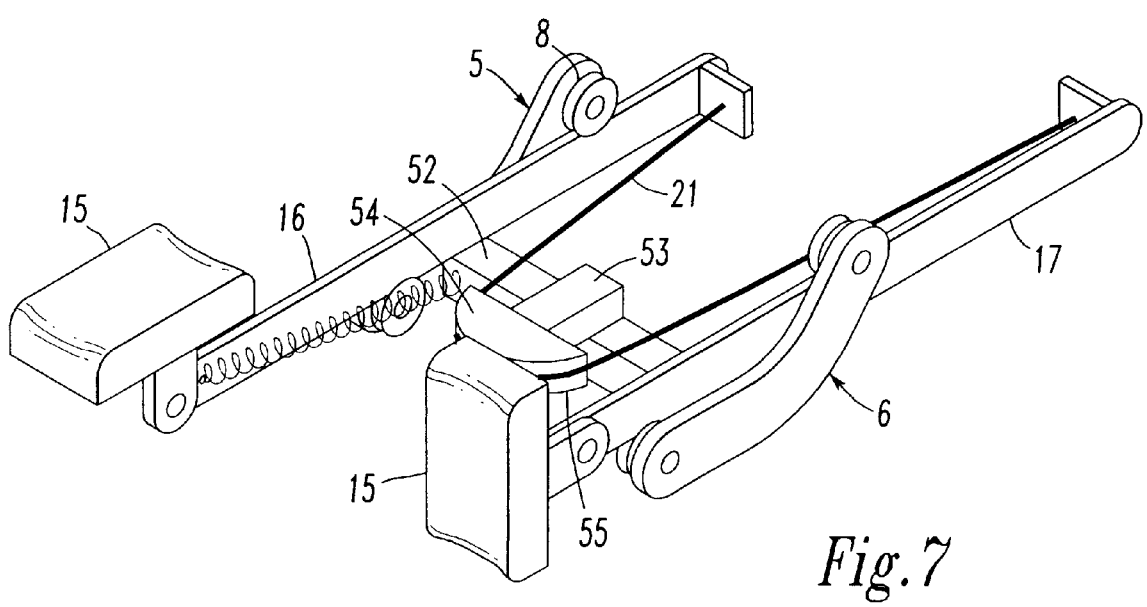
FIG. 7 is a perspective view of a fourth present preferred embodiment of my bicycle seat.

A fourth present preferred embodiment shown in FIG. 7 is similar to the first embodiment. However, in this embodiment there is no pulley. Instead the strap or cable 21 rides over a smooth curved surface 55 of a transition member 54. The transition member 54 is mounted to the elongated cross member 52 by support 53. This transition member is a fixed structure that does not move. Also, the top surfaces of the seat pads 15 are contoured to be saddle shaped.

The pulley and strap linkage used in the present invention is simple to construct and install. This linkage has no heavy gears or sliding levels. The straps can be any material that does not stretch. Light weight metal cables or nylon straps can be used. For these reasons the linkage is light weight. The use of tubular materials for the supports and the guide rails provide strength while minimizing weight. This combination of features results in a bicycle seat that is lighter than other two-piece bicycle seats.

The wings provide a secure structure for mounting the shroud. They also transmit the linear load of the rider into the elongated support and eventually to the frame of the bicycle. Their location is significant in many ways. They are below the rider's hips, but enable the system to create an effective pivot point concentric with the hip joints. They can be mounted to the elongated support in a manner so that their separation can be changed thereby changing the separation of the seat pads. Extensions can be attached to the wings to accommodate fenders, package carriers, or a rumble seat for children, if tied in with the rear fork of the bicycle frame. Being outside the seat support post, the wings do not limit the vertical travel of the seat post permitting the seat post and the present bicycle seat mounted on that seat post to be easily raised and lowered to accommodate the leg length of any rider. The rider can pivot his hips side-to-side to maintain balance as in the case of riding hands-free without the risk of the seat-pads swiveling in an uncontrolled manner as would be the case with the bicycle seat disclosed in U.S. Pat. No. 6,142,562.

Although I have shown certain present preferred embodiments of my bicycle seat it should be distinctly understood that the invention is not limited thereto, but may be variously embodied within the scope of the following claims.

I claim:

1. A bicycle seat comprising:
    an elongated support having a center and two opposite ends;
    a transition member attached to the support;
    a first wing attached to one end of the elongated support and a second wing attached to the opposite end of the elongated support;
    a first guide rail carried by the first wing in a manner to permit movement of the first guide rail over the first wing along a first path, the first guide rail having a front end and a rear end;
    a second guide rail carried by the second wing in a manner to permit movement of the second guide rail over the second wing along a second path, such that the second path is substantially parallel to the first path, the second guide rail having a front end and a rear end;
    a first seat pad attached to the front end of the first guide rail;
    a second seat pad attached to the front end of the second guide rail such that there is a plane intersecting both the first path and the second path through which plane both the first seat pad and the second seat pad pass when the first and second guide rails move along their respective paths; and
    at least one strap passing over the transition member, the at least one strap having one end of the strap attached to the front end of the first guide rail and an opposite end attached to the front end of the second guide rail.

2. The bicycle seat of claim 1 also comprising a spring attached between the elongated support and one of the first guide rail and the second guide rail.

3. The bicycle seat of claim 2 also comprising a second spring attached between the elongated support and one of the first guide rail and the second guide rail.

4. The bicycle seat of claim 1 also comprising at least one guide wheel or bearing attached to each wing and over which one of the first guide rail and the second guide rail travels.

5. The bicycle seat of claim 1 also comprising a second strap passing over the transition member and having one end attached to the rear end of the first guide rail and an opposite end attached to the rear end of the second guide rail.

6. The bicycle seat of claim 1 also comprising a first bracket pivotably attaching the first seat pad to the first guide rail and a second bracket pivotably attaching the second seat pad to the second guide rail.

7. The bicycle seat of claim 6 further comprising a first spring connected between the first seat pad and the first guide rail and a second spring connected between the second seat pad and the second guide rail.

8. The bicycle seat of claim 1 also comprising a mounting bracket attached to the elongated support.

9. The bicycle seat of claim 8 also comprising a horn attached to the mounting bracket.

10. The bicycle seat of claim 1 wherein the first seat and the second seat are saddle-shaped.

11. The bicycle seat of claim 1 wherein the first seat and the second seat are padded posts.

12. The bicycle seat of claim 1 wherein the transition member is at least one pulley.

13. The bicycle seat of claim 1 wherein the transition member is a fixed structure having a smooth, curved surface over which the at least one strap passes.

14. A bicycle seat comprising:
    an elongated support having two opposite ends;
    a transition member attached the support;
    a first wing attached to one end of the elongated support and a second wing attached to the opposite end of the elongated support;
    a first guide rail carried by the first wing in a manner to permit movement of the first guide rail over the first wing along a first path, the first guide rail having a front end and a rear end;
    a second guide rail carried by the second wing in a manner to permit movement of the second guide rail over the second wing along a second path, such that the second path is substantially parallel to the first path, the second guide rail having a front end and a rear end;
    a first seat pad attached to the front end of the first guide rail;
    a second seat pad attached to the front end of the second guide rail such that there is a plane intersecting both the first path and the second path through which plane both the first seat pad and the second seat pad pass when the first and second guide rails move along their respective paths; and
    at least one strap passing over the transition member, the at least one strap having one end of the strap attached to the rear end of the first guide rail and an opposite end attached to the rear end of the second guide rail.

15. The bicycle seat of claim 14 also comprising a spring attached between the elongated support and one of the first guide rail and the second guide rail.

16. The bicycle seat of claim 15 also comprising a second spring attached between the elongated support and one of the first guide rail and the second guide rail.

17. The bicycle seat of claim 14 also comprising at least one guide wheel or bearing attached to each wing and over which one of the first guide rail and the second guide rail travels.

18. The bicycle seat of claim 14 also comprising a first bracket pivotably attaching the first seat pad to the first guide rail and a second bracket pivotably attaching the second seat pad to the second guide rail.

19. The bicycle seat of claim 18 further comprising a first spring connected between the first seat pad and the first guide rail and a second spring connected between the second seat pad and the second guide rail.

20. The bicycle seat of claim 14 wherein the first seat and the second seat are padded posts.

21. The bicycle seat of claim 14 wherein the transition member is a fixed structure having a smooth, curved surface over which the at least one strap passes.

22. The bicycle seat of claim 14 wherein the transition member is at least one pulley.

23. A bicycle seat comprising:
- an elongated support having a center and two opposite ends;
- a pulley attached to the center of the support;
- a first wing attached to one end of the elongated support and a second wing attached to the opposite end of the elongated support;
- a first guide rail carried by the first wing in a manner to permit movement of the first guide rail over the first wing along a first path, the first guide rail having a front end and a rear end;
- a second guide rail carried by the second wing in a manner to permit movement of the second guide rail over the second wing along a second path, such that the second path is substantially parallel to the first path, the second guide rail having a front end and a rear end;
- a first seat pad attached to the front end of the first guide rail;
- a second seat pad attached to the front end of the second guide rail such that there is a plane intersecting both the first path and the second path through which plane both the first seat pad and the second seat pad pass when the first and second guide rails move along their respective paths;
- a first strap passing over the pulley, the first strap having one end attached to the front of the first guide rail and an opposite end attached to the front end of the second guide rail; and
- a second strap passing over the pulley, the second strap having one end attached to the rear of the first guide rail and an opposite end attached to the rear end of the second guide rail.

24. The bicycle seat of claim 23 also comprising a spring attached between the elongated support and one of the first guide rail and the second guide rail.

25. The bicycle seat of claim 24 also comprising a second spring attached between the elongated support and one of the first guide rail and the second guide rail.

26. The bicycle seat of claim 25 also comprising at least one guide wheel or bearing attached to each wing and over which one of the first guide rail and the second guide rail travels.

27. The bicycle seat of claim 23 also comprising a first bracket pivotably attaching the first seat pad to the first guide rail and a second bracket pivotably attaching the second seat pad to the second guide rail.

28. The bicycle seat of claim 23 also comprising a mounting bracket attached to the elongated support.

29. The bicycle seat of claim 28 also comprising a horn attached to the mounting bracket.

30. The bicycle seat of claim 23 wherein the first seat and the second seat are saddle-shaped.

31. The bicycle seat of claim 30 further comprising a first spring connected between the first seat pad and the first guide rail and a second spring connected between the second seat pad and the second guide rail.

32. The bicycle seat of claim 23 wherein the first seat and the second seat are padded posts.

* * * * *

UNITED STATES PATENT AND TRADEMARK OFFICE
CERTIFICATE OF CORRECTION

PATENT NO. : 6,609,751 B1 Page 1 of 1
DATED : August 26, 2003
INVENTOR(S) : George M. Angelo It is certified that error appears in the above-identified patent and that said Letters Patent is hereby corrected as shown below:

Title page,
Item [56], References Cited, FOREIGN PATENT DOCUMENTS, change "21217740" to -- 2121740 --.

Signed and Sealed this

Twentieth Day of January, 2004

JON W. DUDAS
*Acting Director of the United States Patent and Trademark Office*